CROSS-TALK NEUTRALIZATION IN COLOR PICK-UP TUBE

Filed March 20, 1952 4 Sheets-Sheet 1

INVENTORS
Robert E. McCoy
Algan V. [illegible]

CROSS-TALK NEUTRALIZATION IN COLOR PICK-UP TUBE

Filed March 20, 1952

INVENTORS

Robert E. McCoy

Alguin V. Kalfaian

CROSS-TALK NEUTRALIZATION IN COLOR PICK-UP TUBE

Filed March 20, 1952 4 Sheets-Sheet 3

INVENTORS
Robert E. McCoy
Alyne V. Kalfaian

INVENTORS
Robert E. McCoy

United States Patent Office 2,901,531

Patented Aug. 25, 1959

2,901,531

CROSS-TALK NEUTRALIZATION IN COLOR PICK-UP TUBE

Robert E. McCoy and Meguer V. Kalfaian, Los Angeles, Calif.

Application March 20, 1952, Serial No. 277,632

1 Claim. (Cl. 178—5.4)

Our present invention relates to color television, and more particularly to the camera, or to the pick-up tube and associated equipment, of a color television system.

Color television cameras have been built using a separate pick-up tube for each primary color, with color filters or dichroic mirrors splitting the original optical image into a separate image in each color. Such arrangements are cumbersome and it is difficult to maintain the relative position of their separated images with the precision required for proper operation of the system. Other color television cameras have employed mechanically moving color filters, thereby periodically changing the color sensitivity of the pick-up tube. These are useful for field-sequential color systems, but their mechanical parts cannot operate fast enough for a line-sequential or dot-sequential systems; nor can they be adapted for a simultaneous-color system.

Among the objects of our invention are: to provide a pick-up tube selectively responsive to each primary color; to provide signals representing each color component of an image, from a single pick-up tube, in a form readily separable; to provide means for translating the signals from such a tube into simultaneous-color television signals, or into any known type of sequential-color signals; to provide a color-television camera with only one pick-up tube, without continually-moving parts; to provide a television camera adaptable to any of the known color-television systems; and to provide a color television camera practically as compact as a monochrome television camera of comparable quality.

Figure 1:
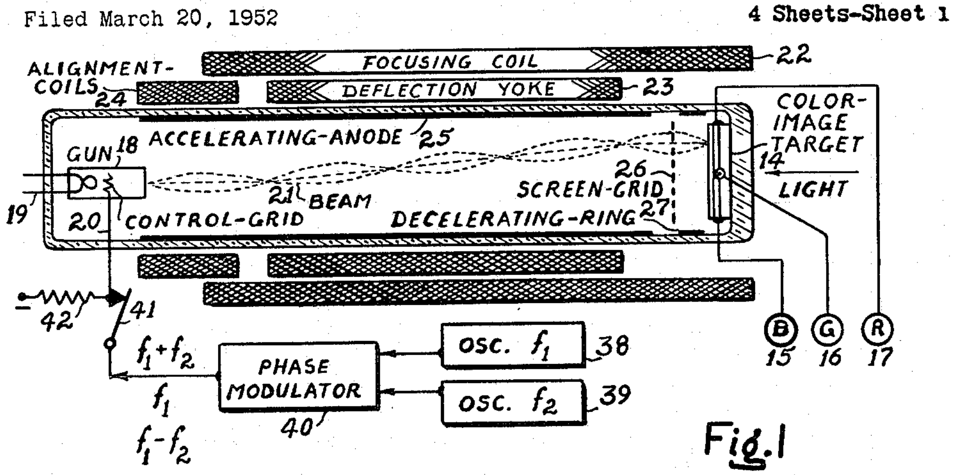
Figure 2:
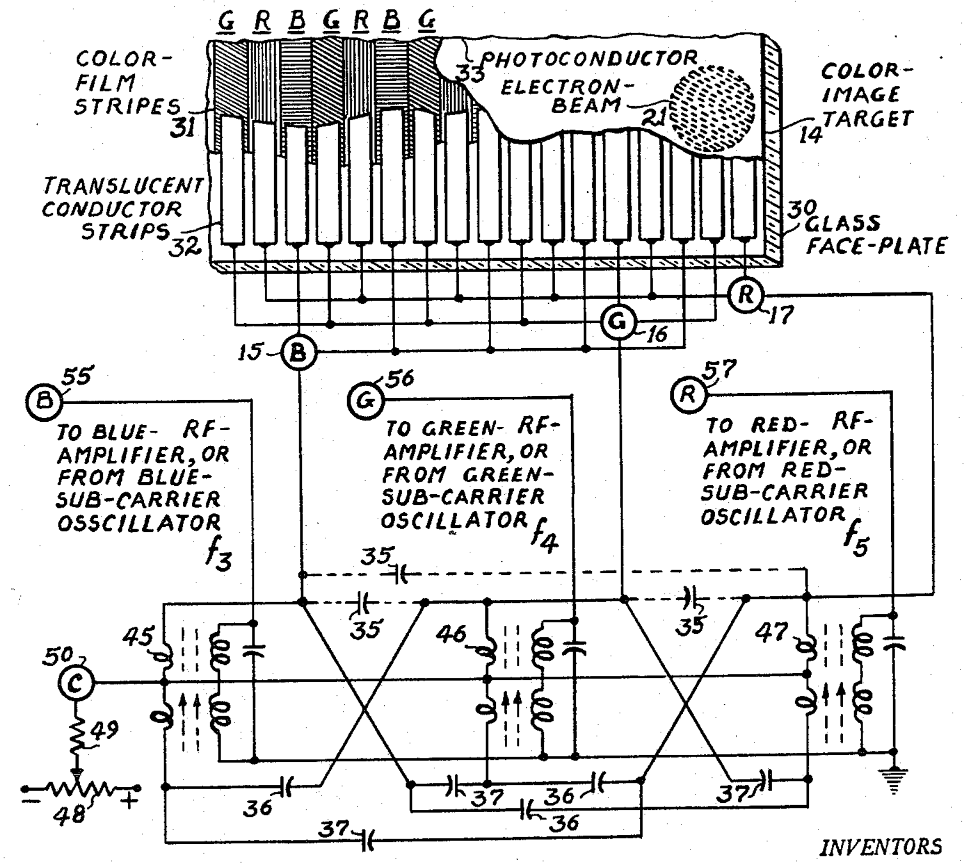
Figures 3, 5:
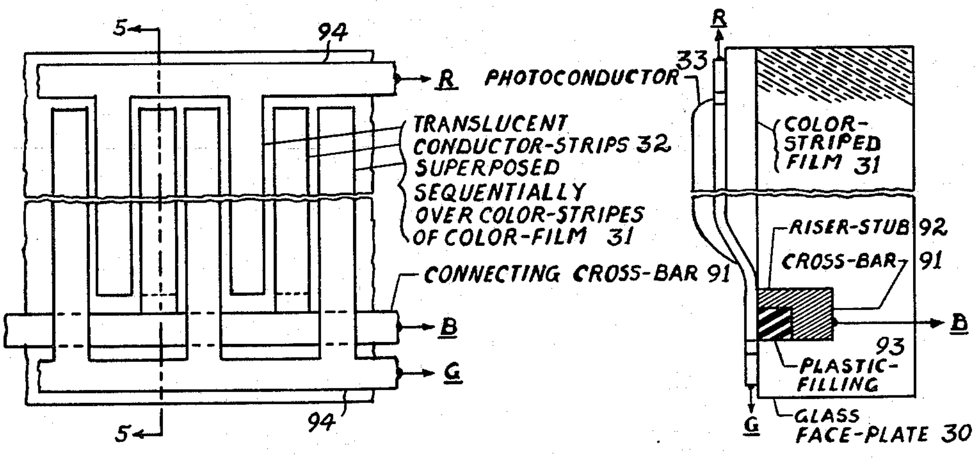
Figures 4, 6:
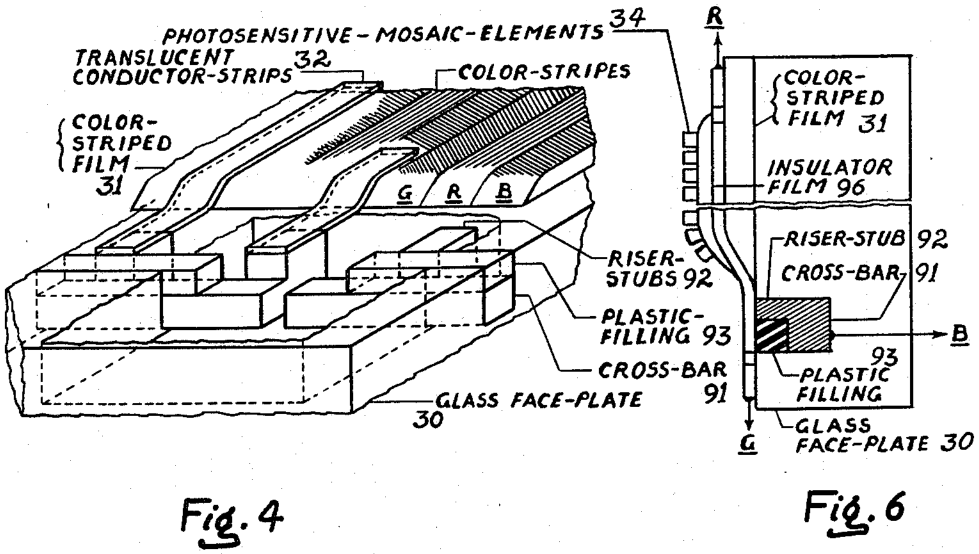
Figures 7, 7A, 7B:
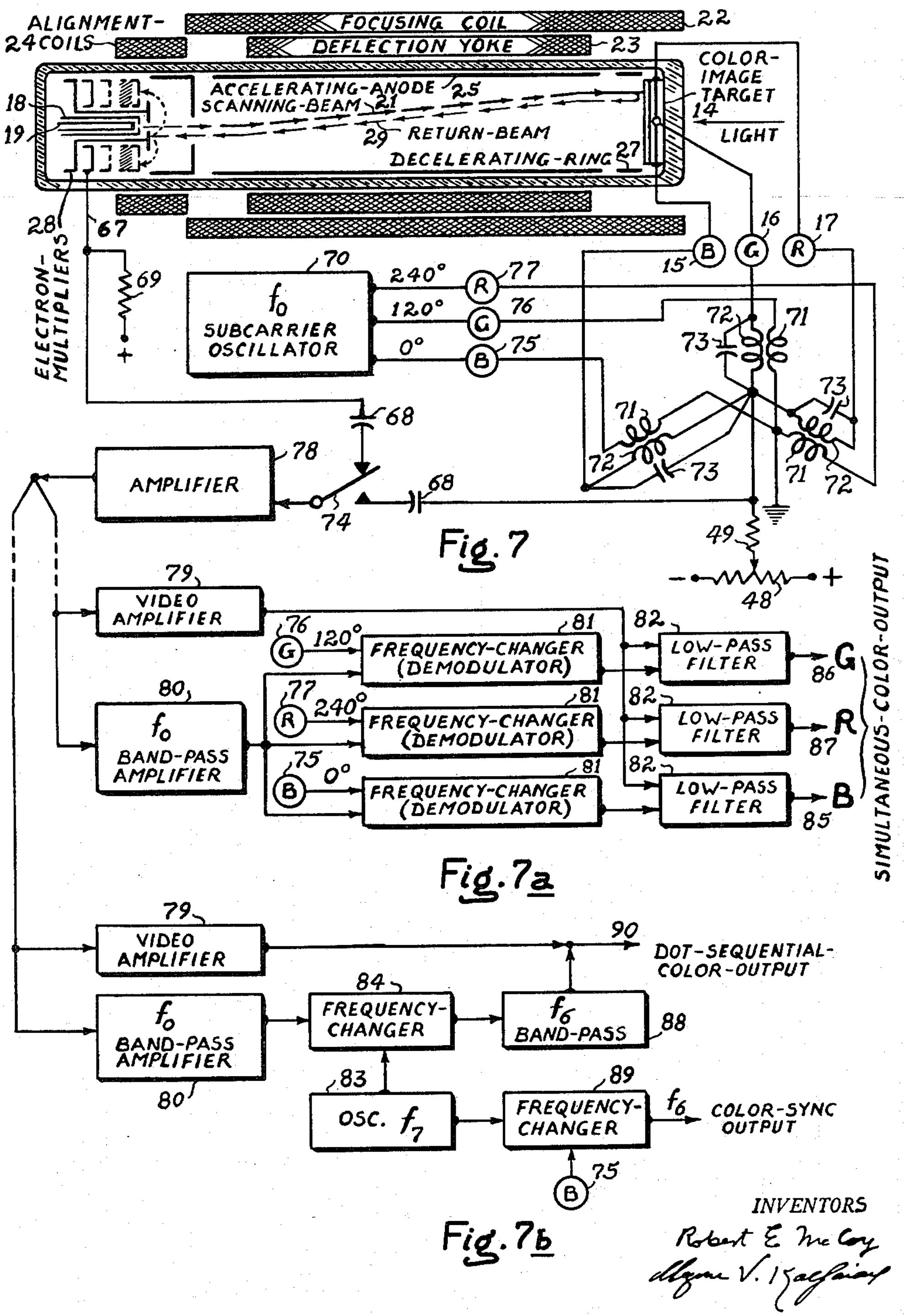
Figure 8:
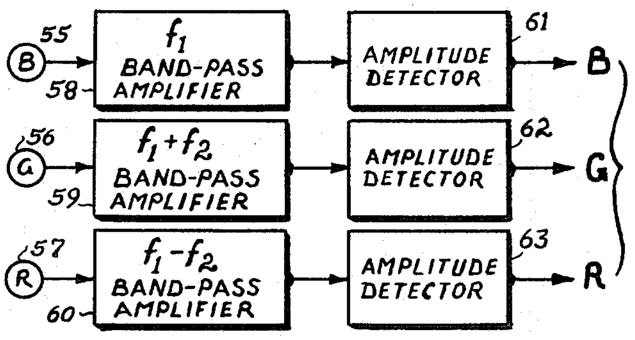
Figure 9:
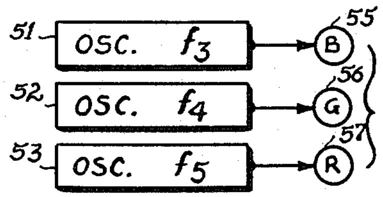
Figure 10:
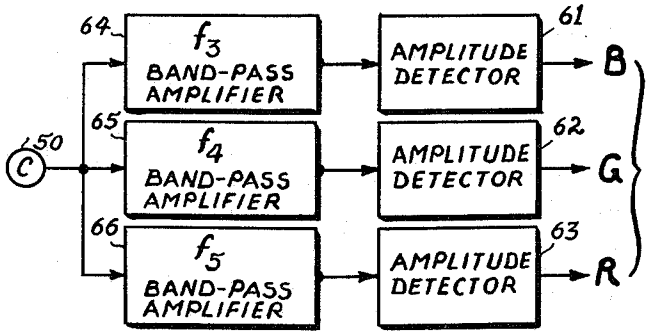

These and other objects of our invention may be seen more readily by reference to the drawings, in which:

Fig. 1 is a (partly schematic) lognitudinal section of a pick-up tube incorporating a color-image target; Fig. 2 is a schematic diagram of a frequency-selective circuit connected to a color-image target; Fig. 3 is a plan view of a color-image target according to our invention; Fig. 4 is a perspective view of a color-image target according to our invention, partly cut away to show internal details of its construction; Fig. 5 is a section through a photoconductive target; Fig. 6 is a section through a photoconductive target; Fig. 7 is a schematic diagram of a pick-up tube incorporating a color-image target, together with circuits for controlling it to produce modified dot-sequential color signals; Fig. 7*a* and Fig. 7*b* are block diagrams showing, respectively, means for translating the signals of Fig. 7 into simultaneous-color and into dot-sequential-color television signals; Fig. 8 is a block diagram of a simultaneous-color output circuit for use with Fig. 2; Fig. 9 and Fig. 10 are block diagrams showing respectively control means and signal-separation means for use with Fig. 2 in an alternative simultaneous-color arrangement.

Referring now more particularly to the drawings, Fig. 1 shows a television pick-up tube generally similar to the types known as "Orthicon," "Vidicon" and "CPS Emitron" (see "Television Pickup Tubes Using Low-Velocity Electron-Beam Scanning," by Rose and Iams, Proceedings of the IRE, vol. 27, pp. 547–555, September 1939, and "The Vidicon-Photoconductive Camera Tube," by Weimer, Forgue and Goodrich, Electronics, May 1950, pp 70–73) but containing a special color-image target, 14, with separate terminals 15, 16, 17 corresponding to various primary colors, e.g., blue (B), green (G) and red (R).

Electron gun 18, which includes a cathode 19 and control grid 20 projects a beam of electrons 21 toward the opposite end of the tube. Direct current in focusing coil 22 produces a longitudinal magnetic field, substantially uniform throughout the region traversed by the electrons, which serves to focus the beam. Currents of sawtooth waveform, in the perpendicular coils of deflection yoke 23, superimpose transverse magnetic fields which deflect the beam, making it scan a raster on target 14. Direct currents in alignment coils 24 produce slight additional transverse magnetic fields in the vicinity of electron gun 18; these are adjusted to compensate for any mechanical misalignment between gun 18 and focusing coil 22, so that the electron beam will leave the gun in a direction substantially parallel to the focusing magnetic field. Accelerating anode 25 and screen grid 26 enclose most of the space traversed by beam 21, maintaining it at a substantially uniform electrostatic potential, highly positive with respect to the cathode of the electron gun. Decelerating ring 27 (if used) and target 14 have potentials close to that of cathode 19, so that the resulting electrostatic field will retard the electrons approaching the target, after they pass through screen grid 26. The beam is focused to a very small spot on the target; but at screen grid 26 it covers a relatively large area, several times larger than the holes in the screen, so that the solid portions of the screen intercept only a small (and substantially constant) fraction of the beam.

As described thus far, construction and operation of the pick-up tube are conventional. The novel features of its construction may be seen better from Fig. 2, where a portion of color-image target 14 is sketched in detail. Various types of target might be used, and will be described more fully later. The one shown in Fig. 2 is of the photoconductive type. Target 14 is supported by transparent face plate 30, which usually will serve as the end wall of the pick-up tube, through which light may pass to the target. A color-filtering film, 31, lies in the path of the light. This film contains a large number of very narrow color selective stripes, corresponding to suitable primary colors—e.g., blue (B), green (G) and red (R). Vertical stripes are shown in Fig. 2, but horizontal or diagonal stripes could be used as well. Next to each stripe, and aligned therewith, is a translucent conductor strip 32. The conductor strips on stripes of each color are electrically connected to a corresponding terminal—e.g., those on blue stripes to terminal 15, those on green stripes to terminal 16, and those on red stripes to terminal 17. A layer of photoconductive material, 33, covers conductor strips 32 in the region to be scanned by electron beam 21.

A conventional optical system, not shown, may be used to focus upon the target an optical image of whatever scene is to be televised. The light forming this image passes through striped color film 31 and translucent conductor strips 32 into photoconductive layer 33. From point to point within layer 33, its electrical conductivity varies according to the intensity of illumination received. Electron beam 21, as it scans the rear face of target 14, periodically restores each point on that face to a constant potential (approximately the same as the potential of cathode 19), different from the potentials of translucent strips 32. Differences of potential between front and back of layer 33 cause currents through the layer, in proportion to its electrical conductivity, so that each point on the rear face of the layer tends to change potential and approach the potential of the adjacent conductor strip (on the front face) at a rate proportional to the conductivity of the layer in its vicinity. The photoconductive layer is very thin in comparison to the width of a conductor strip, so that its resistance to transverse currents is much higher than its resistance to fore-and-aft currents, and transverse currents are negligible.

The photoconductive effect produces on the rear face of target 14 an electrical image corresponding to any optical image projected on the target, just as in the monochrome "Vidicon"; but in our invention, the image is broken up into stripes representing different primary colors, due to the filtering effect of striped color film 31.

As electron beam 21 scans the electrical image, discharging each elementary area thereof in turn, corresponding video signals appear at terminals 15, 16 and 17 due to capacitive coupling from each elementary area of the electrical image to the adjacent one of conductor strips 32. This is the desired effect. Unfortunately, even though the strips connected to different terminals are insulated from each other, they are necessarily in close proximity; and the inherent capacitances 35 between adjacent strips are, consequently, high. This tends to cause cross fire between the signals representing different colors, and special compensating arrangements must be employed to make color separation possible.

*Modulated beam*

One such arrangement employs the combination of parts shown in Figures 1, 2 and 8. Oscillator 38 operates at a high frequency, $f_1$ (e.g., 60 mc./s.). Oscillator 39 operates at a frequency, $f_2$ (e.g., 20 mc./s.), that is lower than $f_1$, but still more than twice the highest significant video frequency. Voltages of both frequencies are applied to phase modulator 40, which produces phase modulation of carrier frequency $f_1$ at modulation frequency $f_2$. The modulation index is not critical, so long as it remains fixed; but preferably it should be about 1.43 radians, since this makes the amplitudes of the first-order side-bands equal that of the carrier in the modulator output. These three frequencies $f_1+f_2$, $f_1-f_2$ and $f_1$ are equally important in the final results, while higher-order sidebands ($f_1+2f_2$, $f_1-2f_2$, etc.) make no direct contribution. With switch 41 closed, as shown, the output of phase modulator 40 is applied to control grid 20 of the pick-up tube. The D.C. bias of control grid 20, supplied through resistor 42, is so adjusted that the electron beam is cut off except during the positive half cycles of output from modulator 40. Thus the beam current flows in short pulses, which occur at a rate $f_1$ subject to modulation at frequency $f_2$; and the resulting currents from terminals 15, 16 and 17 of target 14 have a similar high-frequency pulsation. As in the conventional monochrome tubes employing a constant beam current, the outputs here have magnitudes controlled by the electric image on the rear face of the target.

The useful output from terminal 15 is a phase-modulated pulse train, with amplitude modulation at video frequencies corresponding to the blue component of the optical image that is focused upon target 14. Similarly, the useful outputs from terminals 16 and 17 have amplitude modulation corresponding to image details in green and red, respectively. Each terminal is connected to one end (the upper end, in Fig. 2) of the primary coil 45, 46 or 47 in a separate R-F transformer. The train of phase-modulated pulses at one output terminal may be considered as the sum of the three principal sub-carrier waves, at frequencies $f_1+f_2$, $f_1$ and $f_1-f_2$, each amplitude modulated by the same video signal, plus some minor waves of other frequencies (video, $f_1+2f_2$, $f_1-2f_2$, etc.) that are of no immediate concern. (Note that only phase modulation of the beam-control signal will produce appreciable variation in the output signals; amplitude modulation would be ineffective, since the amplitude of the output signals is controlled by the illumination of target 14 rather than the beam current, as long as the beam current is sufficiently large.) Each of the three R-F transformers in Fig. 2 is tuned to select a different one of the available sub-carrier frequencies; and its secondary circuit is connected, through terminal 55, 56 or 57 to a separate R-F band-pass amplifier 58, 59 or 60 (in Fig. 8) tuned to that sub-carrier frequency. These amplifiers raise the selected R-F signals to a conveniently high level, then apply them to amplitude detectors 61, 62 and 63, respectively, for demodulation. The detector outputs are three separate video signals, one representing each primary-color component of the image on target 14.

The inherent capacitance between conductor strips 32 is shown schematically in Fig. 2 by capacitors 35 connected between the upper end of coils 45, 46 and 47. To compensate for the unwanted coupling introduced by these capacitances, we add neutralizing capacitors 36, 37, connected between the upper end of one primary coil (e.g. 45) and the lower end of each of the other primary coils (e.g. 46 and 47). Each of these coils (45, 46, 47) has a center tap maintained at R-F ground potential (terminal 50 being by-passed to ground by a suitable capacitor, not shown), so that the R-F potential appearing at the lower end of the coil is opposite in polarity to that at its upper end, and when applied through a capacitor 36 or 37 adjusted to the proper value (approximately equal to capacitance 35, but most readily determined experimentally) will balance out the effect of the potential applied through capacitor 35. Conversely, although part of the current from any one of the tube terminals (e.g. 15) passes through capacitance 35 toward the upper end of each coil (e.g. 46) that is connected to the other terminals, a similar current passes through capacitor 36 or 37 toward the lower end of said coil; and the two currents tending to flow in opposite directions through the coil cancel one another, producing no net effect on the transformer output. Thus each R-F transformer responds selectively to signals controlled by the image stripes adjacent to the conductor strips 32 associated with one terminal, 15, 16 or 17, and representing one color component of the image on target 14.

The direct (voltage balance) neutralization mentioned above is effective over the range of frequencies for which one transformer can maintain a substantially uniform ratio of transformation between the upper and lower ends of its center-tapped winding. By suitable design this range can be made considerably greater than that required by one subcarrier and its sidebands. Outside of this range, which is approximately the same as the pass band of the tuned transformer considered as a frequency-selective filter, neutralization cannot be complete but cross-fire is still reasonably small because the tuned transformer tends to by-pass (to common terminal 50) currents of frequencies outside its working range, and the voltage developed at either end of its center-tapped winding is therefore relatively small.

The converse neutralization effect (current balance) mentioned above is useful over the range of frequencies for which the two halves of a center-tapped primary winding maintain their transformation ratios relative to the secondary winding in substantially constant proportion to each other. This range may be greater than the transformer pass band, and the frequency-selective properties of the transformer provide further reduction of cross fire at frequencies outside its pass band.

Theoretically, either capacitors 36 or capacitors 37 would be sufficient for neutralization, without the other set of three. Both sets may be used in a variety of proportions with approximately the same total capacitance, 36 being decreased as 37 increases and vice versa. For complete symmetry both sets (36 and 37 may be used, and a third set may be added between the lower ends of the three transformers like capacitances 35 between the upper ends.

The D.-C. voltage needed at conductor strips 32, corresponding to the transparent-conductor film in a "Vidicon" tube, is supplied from source 48 through resistor 49 to terminal 50, thence through the upper half of the primary coil 45, 46 or 47 of each R-F transformer to tube terminals 15, 16 or 17, respectively. For the mode of operation just described, terminal 50 would be kept at R-F ground potential by a suitable by-pass capacitor (not shown).

*Three-frequency target excitation*

Another mode of operation uses the combination of parts shown by Figures 1, 2, 9 and 10, excluding what can be disconnected by opening switch 41. In this case, three separate oscillators, 51, 52, 53 (Fig. 9), generate sub-carrier waves of frequency $f_3$, $f_4$ and $f_5$, which are applied, respectively, to terminals 55, 56, 57 of the R-F transformers in Fig. 2. By choosing $f_3=f_1$, $f_4=f_1+f_2$ and $f_5=f_1-f_2$, these three waves could be generated by a combination of two oscillators (38, 39) and a modulator (40) as in the previous case; but use of separate oscillators generally will be more convenient. Terminal 50, in Fig. 2, which is not capacitively by-passed to ground in this case, becomes the common input terminal of three band-pass amplifiers 64, 65, 66 in Fig. 10. These amplifiers drive amplitude detectors 61, 62, 63. Switch 41 being open, no R-F voltage is applied to control grid 20, and the current of electron beam 21 remains constant during each sweep across the target. (During the retrace periods between sweeps, the beam may be cut off by appropriate means, as is often done in monochrome television cameras; but this is no part of our invention.)

Due to oscillators 51, 52, 53, the potentials of terminals 15, 16 and 17 vary at frequencies $f_3$, $f_4$ and $f_5$, respectively. The neutralizing arrangement previously described is adjusted to prevent cross fire, so that only one of the three frequencies affects each terminal. Similar R-F potentials appear on the rear face of target 14, capacitively coupled from translucent strips 32 through photoconductive layer 33; and their amplitude is adjusted (by suitable adjustment of the voltage delivered by oscillators 51, 52, 53) to be larger than any potential variation produced by photoconductive effects. As a result, electron beam 21 can reach a point in the electric image on the rear face of target 14 only during positive half cycles of the R-F voltage that is applied to the conductor strip 32 nearest that point. The output current available to terminal 15, 16 or 17 occurs in pulses synchronized with the R-F control voltage applied there, and is predominantly a wave of the control frequency ($f_3$, $f_4$ or $f_5$) amplitude modulated at video frequencies according to image details of one primary color—the one selected by the stripes in color film 31 that are aligned with the conductor strips 32 connected to that terminal. Some video-frequency current and harmonics of the controlling sub-carrier appear also, but these have negligible effect.

Output currents from terminals 15, 16 and 17 are affected by the neutralizing arrangement previously described to the extent that each induces voltage only in the transformer directly associated with it; and the voltage so produced is kept small by appropriate design of the R-F transformers, which in this case present a very low impedance to the output currents. (They present a low impedance to the oscillator currents too, but the oscillator currents are much larger than the output currents and produce proportionately larger voltages.) After passing through the primary coils of their respective transformers in Fig. 2, the output currents from terminals 15, 16 and 17 are combined at terminal 50 and applied to the input circuits of band-pass amplifiers 64, 65 and 66 in Fig. 10. These amplifiers present a much higher impedance, over the frequency range covered by the three sub-carriers, then the R-F transformers in Fig. 2; consequently most of the R-F voltage developed by the output currents from terminals 15, 16 and 17 is applied to amplifiers 64, 65 and 66.

Each amplifier responds to one of the three sub-carrier frequencies, but not (appreciably) to the others. After amplification to a conveniently high level, the three separate signals are applied to amplitude detectors 61, 62 and 63 for demodulation, thus producing three video signals representing, respectively, the three primary-color components of the optical image that was projected on target 14.

*Electron multipliers*

In the mode of operation just described, and in others yet to be described, R-F control voltages applied to the target (through terminals 15, 16 and 17) cause corresponding variations of the fraction of beam current reaching the target at any instant. Thus R-F components amplitude-modulated by video-frequency variations appear both in the current collected by the target and in the remainder of the current, which is turned away. The return beam is not used in the mode of operation just described; but it can be used to advantage if the tube structure is modified, as shown in Fig. 7.

This modification consists of a group of electrodes 28 around the electron gun, so arranged as to provide several stages of electron-multiplier amplification for the return beam 29. In itself, it is no part of our invention (it was a feature of one form of "Orthicon" tube, and is included in the more recent image Orthicon); but it permits a modification of the associated circuits to make the input and output portions physically separate. Starting from the arrangement just described, with three-frequency excitation of the target, we substitute the modified tube in Fig. 7 for the type shown in Fig. 1; then we connect the common input terminal of amplifiers 64, 65 and 66 (Fig. 10) to the electron-multiplier output terminal 67 (through capacitor 68 which blocks the high D.-C. voltage supplied to the electron multiplier anode through resistor 69) rather than to terminal 50. Connections from the oscillators of Fig. 9 to the circuits of Fig. 2 remain as described above. The additional amplification provided by the electron multiplier reduces the amplification required of amplifiers 64, 65 and 66, though not affecting the frequency selectivity they must provide. As before, a separate video output is obtained from each amplitude detector (61, 62 or 63) following the R-F band-pass amplifiers, one representing each color in the original image.

*Three-phase target excitation*

A preferred form of our invention is shown in Fig. 7. Here oscillator 70 generates three-phase voltages at a convenient sub-carrier frequency, $f_0$ (e.g. 20 mc./s.) and applies them to the primary coils 71 of three transformers. The secondary coils, 72, of these transformers are Y-connected; their common terminal is connected through resistor 49 to a source 48 which provides a suitable D.-C. potential; and the remaining terminal of each secondary coil is connected to one of the terminals 15, 16, 17 of color-image target 14. Internal capacitance between the electrode strips (32) of the target contributes part of the tuning capacitance for secondary coils 72, while external capacitors 73 provide the rest. The external capacitances can be made considerably larger than the internal capacitances (which is advantageous for stability and ease of adjustment) without loading oscillator 70 very heavily, because the sub-carrier voltages required between terminals 15, 16 and 17 are relatively small.

The three-phase voltages appearing at terminals 75, 76, 77 of oscillator 70, which are applied to primary coils 71, cause corresponding three-phase voltages to be delivered by the three secondary coils 72 to terminals 15, 16, 17 of color-image target 14. The high-frequency ($f_0$) variations of potential at these terminals are transferred from electrode strips 32 to the rear face of target 14 by capacitive coupling (inherent due to the proximity of front and back of the target), superimposing a many-cycle traveling-wave pattern of potential (which travels rapidly across target 14 in a direction perpendicular to electrode strips 32) on the quasi-stationary pattern of the electric image. Each cycle or wavelength in the pattern covers three adjacent stripes. By appropriate adjustment of oscillator 70, the amplitude of this traveling wave is made large in comparison to the potential variations produced by photoelectric effects. (This does not require much voltage; the photo-electric effects rarely produce as much as 10 volts variation of potential in the electric image.) At any instant, the scanning electron beam 21 is attracted to portions of the image near positive peaks of the traveling wave, but repelled by portions near the negative peaks; it therefore scans in sequence, according to the movement of the traveling waves, image elements adjacent to successive electrode strips 32 and color stripes 31 of target 14; and though it would otherwise overlap stripes of all three colors at every instant, because of the control exercised by the traveling-wave pattern the beam is effectively constrained to act on image elements representing one color at a time. On a coarse scale, the beam position is controlled by a conventional scanning system including deflection yoke 23; but on the finer scale required to make a selection between adjacent stripes, beam position is controlled by the traveling waves of frequency $f_0$.

If the electron beam sweeps across the target at substantially the same velocity as the traveling waves, the resultant scanning is sequential both in the color and in the position of the picture elements. If the beam sweeps at a slower speed (which seems generally preferable), the path of its active portion (the areas that overlap the crests of traveling waves at any instant) may double back repeatedly, like the path of an ant crossing a pleated cloth; the active portion of the beam still covers picture elements in regular sequence of color but not necessarily in consecutive order of position, although its deviations from the conventional scanning raster—one or two stripe widths at a time—are no more than the width of the beam, a distance too small to be noticed when the picture is viewed under normal conditions. If the beam sweeps in a different direction, and especially if it sweeps in a direction perpendicular to the direction in which the waves are traveling, its active portion may follow an undulating path; but such undulations, amounting to a shift of one or two stripe widths at most, will not appreciably distort the television picture.

Switch 74 permits a choice between two different modes of operation. With the switch in its lower position, electron multipliers 28 are not used and the results are essentially the same as with the simpler tube structure of Fig. 1. Because of the stripe-selective influence of the traveling waves on target 14, scanning electron beam 21 discharges image elements representing each color at a corresponding time in every cycle of sub-carrier frequency ($f_0$); and the current it delivers to target 14 consists of three interleaved series of pulses, each with repetition rate $f_0$, and each amplitude modulated at video frequency in accordance with one of the primary-color components of the optical image. Each series of pulses is transferred, by capacitive coupling from back to front of target 14, to a conductor strip 32 of the set adjacent to the corresponding color stripes of film 31. Due to the relatively large capacitance between conductor strips 32, cross-fire from one another tends to be large; but this is no disadvantage. Nearly equal parts of the current in each series of pulses flow through all three of the target terminals 15, 16, 17, and through the three secondary coils 72. The combined current flows through resistor 49, producing a useful signal voltage. The impedance presented by the three secondary coils 72 (including the effects of associated circuit elements, capacitors 73 and primary coils 71) is small compared to that of resistor 49; and its effect on the useful signal is practically negligible. Because the polyphase voltages delivered by the oscillator are balanced, they produce no net current through resistor 49, although they do produce large circulating currents (much larger than the beam current) through the secondary coils 72 and capacitors 73.

The signal voltage developed across resistor 49 is amplified by amplifier 78 and passed along to other circuits shown in Fig. 7*a* or Fig. 7*b*. It consists of two main parts, a video-frequency component, and a video-modulated subcarrier of frequency $f_0$, which together form a dot-sequential color-television signal with fundamental color-commutation frequency $f_0$.

The three-phase voltages applied to terminals 15, 16 and 17 may be described mathematically as $E \cos \theta$, $E \cos (\theta+120°)$ and $E \cos (\theta+240°)$, respectively, where $\theta=360° f_0 t$ and $t$ is elapsed time. Let B, G and R denote the intensities of the three color components in whatever elementary area of the image happens to lie under the scanning beam at the moment; then to a first approximation (neglecting terms that involve frequencies $2f_0$, $3f_0$, etc.) the total beam current reaching the target and flowing through terminals 15, 16, 17 to resistor 49 may be expressed in the form $$i=[a+b \cos \theta]B+[a+b \cos (\theta+120°)]G + [a+b \cos (\theta+240°)]R=V+S \quad (1)$$

where $$V=(B+G+R)a \quad (2)$$

$$S=[B \cos \theta+G \cos (\theta+120°)+R \cos (\theta+240°)]b=[(V/a)-(G+B)(3/2)]b \cos \theta+(R-G)(b \sin 120°) \sin \theta \quad (3)$$

$a$ and $b$ being constants that depend on the D.-C. bias voltage applied by source 48, and on the amplitude (E) of the applied three-phase voltage.

Of the terms listed above, V represents a video signal proportional to the brightness of the image in the area under the scanning beam while S represents a subcarrier, of frequency $f_0$, with video modulation corresponding to color minus brightness, or to the difference between the color image intensities and what would be required to make a black-and-white image of equal brightness. (Color components may be defined in such a way that $B=G=R$ and $S=0$ for white portions of the image.)

According to the arrangement shown in Fig. 7*a*, these two parts are amplified separately in amplifiers 79 and 80, the former being a video amplifier and the latter a subcarrier amplifier with its pass-band centered at frequency $f_0$. The output of band-pass amplifier 80 is applied to three frequency changers or synchronous demodulators 81, each controlled by a different one of the three outputs from oscillator 70; these deliver three video outputs which are applied to separate low-pass filters 82. These filters 82 serve primarily to block frequencies outside the video range, such as oscillator frequency $f_0$ and the lower sideband of the modulated sub-carirer. The output of video amplifier 79 is added to that of each frequency changer 81, either before (as shown) or after the low-pass filters 82, thus forming three separate video signals. These "simultaneous color" video signals appear at terminals 85, 86, 87. If the relative gain and delay in amplifiers 79 and 80 are properly matched, they will be substantially the same as the video signals that might be obtained by projecting the same optical image through three color filters (like the different stripes in film 31) onto the photosensitive surfaces of three separate monochrome pick-up tubes, each having its target connected to a separate video amplifier.

Mathematically, the effect of each demodulator 81 is to multiply its signal input (the output of amplifier 80) by a factor proportional to its control input (from oscillator terminal 75, 76 or 77). Both terms in the product include factors, like $\cos \theta$, that vary at frequency $f_0$; but by use of the trigonometric identity $$2 \cos p \cos q=\cos(p+q)+\cos(p-q) \quad (4)$$

the product may be expressed in an equivalent form involving sum and difference (heterodyne) frequencies.

Dropping the sum-frequency terms and terms proportional to the signal and control inputs, all of which are rejected by low-pass filters 82, the significant outputs from the three demodulators may be written as follows:

$$\overline{S\cdot A\cos\theta}=(2B-G-R)(A') \quad (5)$$

$$\overline{S\cdot A\cos(\theta+120°)}=(2G-R-B)(A') \quad (6)$$

$$\overline{S\cdot A\cos(\theta+240°)}=(2R-B-G)(A') \quad (7)$$

Here A and A' are proportional to the constant $b$ mentioned above, to the gain of amplifier 80 and to the conversion gain of demodulator 81.

The output of video amplifier 79 may be written similarly as $$V'=(B+G+R)A'' \quad (8)$$

A'' being proportional to the constant $a$ previously mentioned, and to the gain of amplifier 79. The relative gains of amplifier 79 and 80 should be so adjusted that $A''=A'$; then the final outputs of the three low-pass filters 82 will be proportional to the corresponding color components:

$$B'=(2B-G-R)A'+(B+G+R)A''=(B)(3A') \quad (9)$$

$$G'=(2G-R-B)A'+(G+B+R)A''=(G)(3A') \quad (10)$$

$$R'=(2R-B-G)A'+(R+G+B)A''=(R)(3A') \quad (11)$$

Simple tests can be used to determine the proper adjustment of relative gain in the two amplifiers. For example, the optical system of the television camera may be focused on an object marked in a single primary color; then the gain of one amplifier (either 79 or 80) may be adjusted until video signals representing that color appear at the corresponding one of output terminals 85, 86 and 87, with a minimum of cross-fire to the other two of those terminals. The same sort of test can be used to determine whether the phase relations of the outputs from oscillator 70 are correct; any maladjustment will be indicated at output terminals 85, 86, 87 by cross-fire from one color to another; and the proper adjustment is that which minimizes such cross-fire. It can be shown, theoretically, that there would be no cross fire if the over-all gain and delay for signals passing from electron beam 21 to output terminals 85, 86, 87 were exactly the same whether they came through amplifier 79 or through amplifier 80 (i.e., $A'=A''$ in the equations above), and if oscillator 70 provided perfectly-balanced three-phase voltages both at target 14 and at the three frequency changers 81. This assumes, of course, that the equipment is designed with normal precautions against cross fire, including adequate shielding between circuits that are supposed to be separate, and choice of frequency $f_0$ high enough so that the frequency ranges passed by amplifiers 79 and 80 do not overlap.

Various arrangements for translating "simultaneous-color" television signals into "sequential-color" signals are known to the art. Essentially, these employ switching or commutating devices to connect each of the primary-color signals, in sequence, to a common output terminal. Any of these arrangements may be added to that shown in Fig. 7*a* to produce sequential-color video output.

For dot-sequential color, an arrangement simpler than the additions just mentioned is shown in Fig. 7*b*. As in the arrangement of Fig. 7*a*, the two parts of the output of amplifier 78 are amplified separately by video amplifier 79 and sub-carrier amplifier 80. Oscillator 83, operating at frequency $f_7$, drives (heterodyne) frequency changer 84 to translate the output of amplifier 80 to a new frequency range centered at frequency $f_6$ instead of $f_0$. After passing through band-pass filter 88, the translated subcarrier is added to the output of video amplifier 79 to produce a dot-sequential color video signal whose fundamental color-commutation frequency is $f_6$. Oscillator 83 also drives a second frequency changer, 89; this translates an unmodulated voltage of frequency $f_0$, obtained from one phase of oscillator 70, to the final color-commutation frequency $f_6$, thus providing a reference signal for color synchronizing purposes. Various methods have been proposed for using such a reference signal to control the sweep frequencies, and for combining it with the standard synchronizing pulses and video signals, before broadcasting the composite television signal; but their details are no part of our invention. Suffice it to say that a dot-sequential color receiver needs a reference signal, related in a predetermined manner to the frequency and phase of the color-commutation process, from which it can derive control inputs for demodulators that serve the receiver in a manner similar to that of demodulators 81 in Fig. 7*a*. Such a reference signal may be transmitted as a short sample (5 to 10 cycles in a burst) of the color-commutation frequency ($f_6$), phased so that positive peaks occur at the time of a specified color in the dot-sequence, and inserted in the composite video signal during the blanking interval that follow each horizontal synchronizing pulse. Alternatively, the trailing edge of the horizontal sync pulse may be very accurately matched to a reference phase of frequency $f_6$; then the receiver can synthesize the ($f_6$) reference voltage it needs by means of a crystal controlled oscillator (as we have shown in Patent No. 2,677,723) re-started at the trailing edge of each horizontal sync pulse.

If frequency $f_0$ is chosen the same as $f_6$, the frequency translations indicated in Fig. 7*b* become unnecessary; the output of amplifier 78 can be used directly as the color video signal, and oscillator 70 can be used directly to provide a reference signal for color synchronization. This is an economical arrangement, but it cannot equal the high quality and flexibility of performance obtainable with the slightly more complicated arrangement previously described, where the color-commutation frequency $f_0$ at the pick-up tube is considerably higher than the corresponding frequency $f_6$ in the signal finally transmitted. Use of the higher frequency $f_0$ provides a wide separation between the highest significant video frequency and the nearest adjacent frequency in the lower sideband of the modulated sub-carrier leaving the pick-up tube, thus simplifying the design of filters to separate the two frequency ranges as in amplifiers 79 and 80. When the video and video-modulated sub-carrier are separated, their relative amplitude can be adjusted readily, as might be desired (say) to introduce some form of pre-emphasis; or one of them can be modified to produce special effects, such as "crispening"; and a simple adjustment of the bandwidths of the two selective filters (in amplifiers 79 and 80) can be made to control the allocation of the final transmitted frequency band between brightness information (the part coming from our pick-up tube at video frequency) and color information (the part coming from our pick-up tube as a modulated sub-carrier). In particular, if the pass band of amplifier 80 is made less than twice that of amplifier 79, the final signal delivered at terminal 90 will be essentially a dot-sequential color signal employing "mixed highs"; that is, it will have full color fidelity for image details coarse enough to be represented by video frequencies up to half the bandwidth of amplifier 80, but for finer details it will provide only brightness or "black and white" information.

When switch 74 (Fig. 7) is in its upper position, the output of the pick-up tube comes from electron multipliers 28 rather than directly from target 14. The additional amplification provided by the electron multipliers reduces the gain required of amplifier 78, and may even make that amplifier superfluous. Resistor 49 is superfluous and might well be replaced by a short circuit, since the voltage developed across it is not used with switch 74 up. Balancing of the three-phase voltages is slightly less critical in this case; and because greater physical separation is possible, less shielding is needed to isolate oscillator 70 from the output circuits. These differences, however, do not affect the operation of the translation arrangements shown in Fig. 7*a* and 7*b*.

Neither does the choice of target types; the photo-emissive type shown in Fig. 6 may be operated at a different D.-C. voltage, and may differ in sensitivity from the photoconductive type shown in Fig. 4, thus requiring a different adjustment of voltage source 48 and a different amount of gain in amplifier 78; but both types are affected in the same way by the sub-carrier voltages applied to their strip electrodes (32), and both deliver signals of the same general character.

*Target structure*

Structural details of targets according to our invention are illustrated in Figs. 3 and 4, the former being a plan view and the latter a perspective view, partly cut away to show the interior. The photosensitive elements are omitted in these two views, to avoid obscuring the underlying details. Figs. 5 and 6 are sections taken on the line 5—5 in Fig. 3 with the photosensitive elements added; Fig. 5 shows the arrangement in a photoconductive type of target and Fig. 6 the same view for a photo-emissive type of target.

For either type of target, the foundation is face plate 30, which may be made of glass or other transparent material. Upon this is placed color-striped film 31, containing a large number of parallel stripes in regular color sequence such as blue, green, red, blue, . . . etc. The exact choice of colors, and the manner in which the selective light transmission of each stripe tapers off for wavelengths increasingly different from that representing its nominal color, are matters that need not be discussed here; the important point is that the stripes do act as color-selective filters, and suitable filter characteristics are known. The color stripes can be produced by color photography, by printing with colored inks or dyes, or by mechanically assembling thin strips of color filter material. In the mechanical process, sheets of filter material, each as thick as the width of one strip, are stacked in proper color sequence; the sheets are bonded into a solid stack, by cementing or fusing together adjacent surfaces; then the stack is sliced, in a direction perpendicular to the original sheets, to make striped sheets.

Three sets of translucent conductor strips 32 are placed over color-striped film 31, one in alignment with the stripes of each color. Two of these sets have their strips connected together at opposite ends, as shown in Fig. 3. These connections, and the strips themselves, can lie in substantially a single plane; but to avoid contact with the first two sets, connections between strips of the third set must make a detour out of that plane. A simple arrangement for connecting the third set of strips can be constructed as follows: Before conductor strips 32 are put in place, a groove is made across the rear of face-plate 30, in a position that will be adjacent to one end of each strip. At positions corresponding to the third set of conductor strips, the groove is widened with notches extending to one side—upwards, in the drawings. Photoengraving or etching techniques can be used to advantage here, since the volume of material to be removed is very small. Next, the groove is partly filled by cross bar 91, which may be (for example) a bare wire or film of metal deposited in the groove by sputtering; and the notches beside it are filled with metal to form riser stubs 92 electrically connected to the cross bar. Any surplus metal, particularly any metal reaching the surface of face plate 30 outside the areas assigned to the third set of strips 32, is removed (by cutting, grinding, or etching); and plastic filling 93 is placed over cross bar 91, thus closing the groove and insulating the cross bar from the conductor strips that must eventually pass over it.

After the groove is filled and color-striped film 31 is in place, conductor strips 32 can be applied and connected all at once. One method is to apply transparent conductor material through a stencil, masking the places where gaps are needed to keep the strips separate; another is to apply a continuous film of transparent conductor over the whole face plate, mask the areas where conductor strips are desired, then etch away the rest. In either case, conductor strips 32 in two of the interleaved sets are connected by cross-wise strips 94 of the same material, at opposite ends, while the strips of the third set are connected via riser stubs 92 and cross bar 91. All of these connections are outside the area to be covered by the optical image.

For a photoconductive type of target, as shown in Fig. 4, photoconductive layer 33 is placed directly over conductor strips 32. It may be applied either as a continuous layer, overlapping all the conductor strips, or in a mosaic of spots or strips so that there are gaps between the parts touching different conductor strips. The former is generally preferred, because it is simpler; and there are known photoconductive materials of extremely high resistivity, with which insulation leakage between conductor strips 32 can be made negligible even though the photoconductive layer overlaps adjacent strips.

For photo-emissive type of target, as shown in Fig. 6, a thin film of high-resistivity material 96 is placed over conductor strips 32; and on this film is deposited a mosaic of photo-emissive particles 34. The added insulation and the mosaic form are necessary to avoid insulation leakage between conductor strips, in the photo-emissive type of target, because the most efficient photo-emissive materials known are electrical conductors.

While we have described particular embodiments of our invention, numerous substitutions of parts, adaptations and modifications are possible without departing from the spirit and scope thereof.

What we claim is:

In a color television system employing an image pickup tube of the type having a plurality of electrodes responsive to different component colors, said response being electrically modulatable and said electrodes having undesired but inevitable mutual capacitance: means for producing alternating voltages at a plurality of frequencies; means for applying said voltages to modulate the response of said electrodes; a plurality of tuned transformers, one tuned to each of said frequencies; connections from a first terminal in each of said transformers to a corresponding one of said electrodes; connections from a second terminal in each of said transformers to a common point; a third terminal in each of said transformers having its potential relative to the second terminal opposite in polarity from the potential of the first terminal in the same transformer; and a plurality of capacitances connected from the third terminal of one transformer to the first terminal of another transformer, said capacitances being so adjusted that their contribution to coupling between transformers is substantially equal and opposite to the coupling produced by inter-electrode capacitances, thereby making the voltage at each electrode substantially independent of the voltages at the other electrodes.

References Cited in the file of this patent

UNITED STATES PATENTS

| | | |
|---|---|---|
| 2,446,791 | Schroeder | Aug. 10, 1948 |
| 2,507,958 | Cassman | May 16, 1950 |
| 2,579,971 | Schade | Dec. 25, 1951 |
| 2,586,482 | Rose | Feb. 19, 1952 |
| 2,589,386 | Huffman | Mar. 18, 1952 |
| 2,615,976 | Rose | Oct. 28, 1952 |
| 2,734,938 | Goodale | Feb. 14, 1956 |